Oct. 25, 1966  W. R. KING  3,280,979
PRESSURE FLUID FILTERS

Filed Jan. 21, 1966  5 Sheets-Sheet 4

INVENTOR
William R. King

BY *Shley & Shley*
ATTORNEYS

Oct. 25, 1966 W. R. KING 3,280,979
PRESSURE FLUID FILTERS
Filed Jan. 21, 1966 5 Sheets-Sheet 5

INVENTOR
William R. King

BY Ihley & Ihley

ATTORNEYS

United States Patent Office 3,280,979
Patented Oct. 25, 1966

3,280,979
PRESSURE FLUID FILTERS
William R. King, P.O. Box 2269, Longview, Tex.
Filed Jan. 21, 1966, Ser. No. 522,179
15 Claims. (Cl. 210—108)

This invention relates to new and useful improvements in self-cleaning pressure fluid filters.

The filter is of the type having a vessel divided into inlet and outlet chambers by transverse partition means with a plurality of filter elements arranged in one circle in the outlet chamber and having inlet ends communicating with the inlet chamber through the partition means whereby gaseous fluid flowing through the vessel is forced through the filter elements. Novel cleaning means is provided for cleaning the filter elements by a reverse flow of the fluid through said elements and includes a discharge passage for successive registration with the inlet ends of said elements to permit fluid from the outlet chamber to flow in a reverse direction through said elements into the discharge passage. Choke or other means is provided for restricting flow through the discharge passage so as to limit the rate of flow to the maximum amount required to clean the filter elements.

For coacting with the choke or flow restricting means, pressure responsive valve means communicates with the discharge passage so as to be exposed to the fluid pressure therein as well as to the fluid pressure in the outlet chamber for actuation by the differential between said pressures, said passage pressure imparting closing movement to the valve means and said chamber pressure imparting opening movement to said valve means whereby fluid is admitted to said discharge passage directly from said outlet chamber whenever the pressure differential exceeds a predetermined amount to prevent excessive pressure drop across the filter elements when said choke or flow restricting means permits a volume of reverse flow greater than that required to clean said elements. Although the pressure differential could be controlled by differential areas of the valve means, it is preferred to provide positive means for biasing or urging said valve means toward its closed position in coaction with the pressure fluid in the discharge passage so as to more accurately and/or economically control said pressure differential. It is noted that the valve means moves or fluctuates between opened and closed positions, opening or partially opening when the volume of fluid in the discharge passage is insufficient to satisfy the capacity of the choke means and closing or partially closing when said fluid volume satisfies or approaches said choke capacity.

Another important feature of the invention resides in the provision of velocity equalizing or flow diffusing means which is so arranged that all of the gaseous fluid flowing through the filter must pass therethrough whereby substantially all of the liquid entrained in said fluid is separated therefrom by the filter elements. The separated liquid is in mist form and coalesces on the exterior of the filter elements in droplets which collect in small streams for running off of said elements when the velocity of the fluid across said elements is not excessive. The equalizer is adapted to prevent the velocity of the fluid from becoming sufficient to blow the coalesced liquid from the exteriors of any portions of the filter elements and thereby pick up and carry said liquid from the filter. If desired, the velocity equalizer may be arranged to impart circuitous movement to the fluid and may include baffle means to ensure against re-entrainment of the liquid. Essentially, the equalizer functions as a velocity reducer or retarder by slowing down the flow of the fluid externally of the filter elements whereby said fluid is forced to flow laterally within the outlet chamber before escaping therefrom. The velocity of the fluid increases longitudinally of the filter element exterior and without the equalizer has a tendency to be blown from the outlet or outer portions thereof.

A construction designed to carry out the invention will be hereinafter described, together with other features of the invention.

The invention will be more readily understood from a reading of the following specification and by reference to the accompanying drawings, wherein examples of the invention are shown, and wherein:

Figures 1, 2, 3, 6:
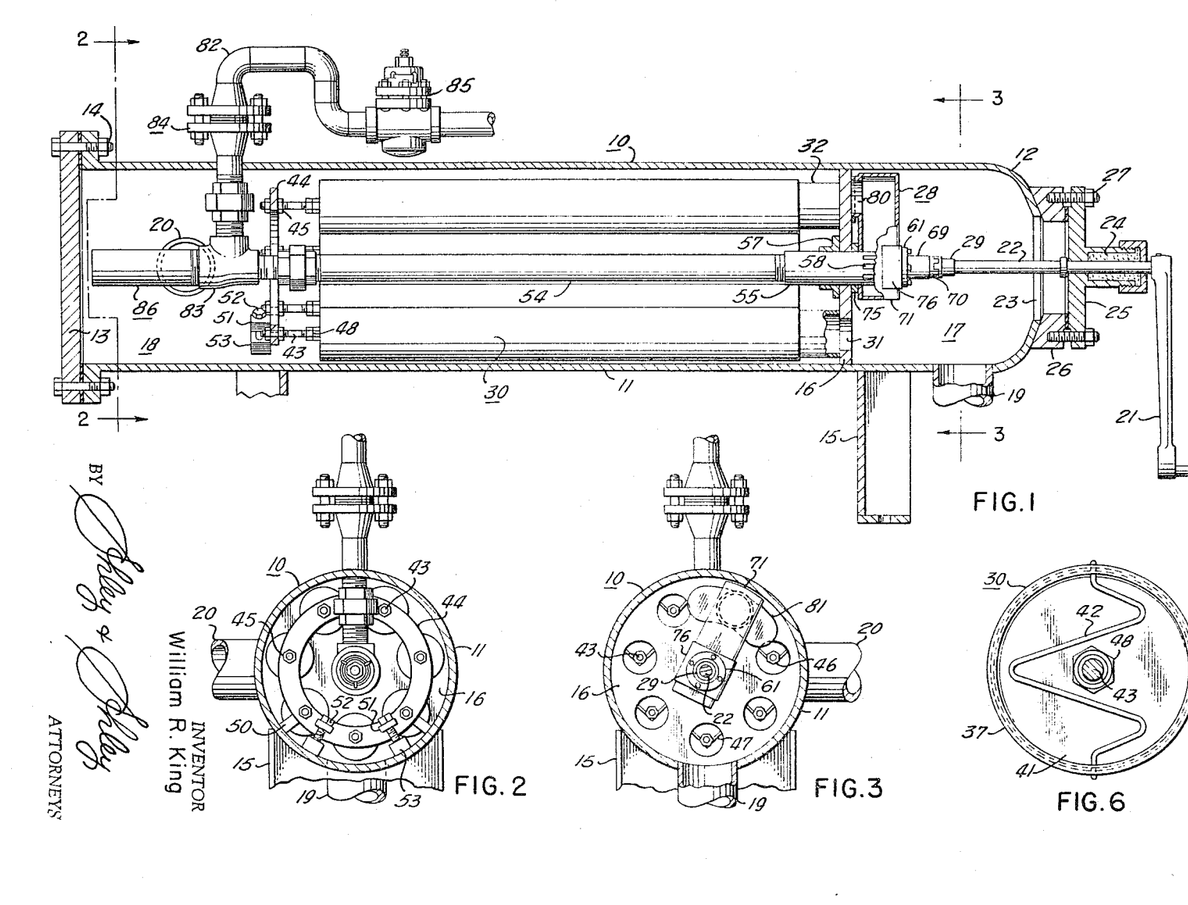
FIG. 1 is a longitudinal, vertical, sectional view of a self-cleaning pressure fluid filter constructed in accordance with the invention.
FIG. 2 is a transverse, vertical, sectional view taken on the line 2—2 of FIG. 1.
FIG. 3 is a view, similar to FIG. 2, taken on the line 3—3 of FIG. 1.
FIG. 6 is a view, similar to FIG. 5, taken on the line 6—6 of FIG. 4.

In the drawings, the numeral 10 designates the elongate vessel of a filter for gas and other fluids under pressure which may have a cylindrical side wall 11, a dished end wall or head 12 at one end and a relatively thick, flat closure plate or head 13 removably fastened to its externally flanged opposite end by suitable bolts and nuts 14. The vessel is adapted to be supported in a substantially horizontal position by upright legs 15 which depends from the side wall 11; however, as will be apparent, the vessel may be supported in a substantially vertical or other position. An upright wall or partition 16 extends transversely of the vessel 10 adjacent its dished head 12 so as to divide the interior of said vessel into a relatively small or short inlet chamber 17 and a relatively large or long outlet chamber 18. The inlet chamber 17 has a lateral inlet 19 in the side wall of the vessel for receiving pressure fluid from a source (not shown) and the outlet chamber 18 has a suitable outlet 20 in said side wall adjacent the removable closure plate 13. A crank 21 has its shaft 22 extending through an axial opening 23 in the dished head into the inlet chamber and journaled in an external stuffing box 24 which is carried by a flat closure disk or plate 25 removably fastened by suitable bolts and nuts 27 to a reinforcing collar or ring 26 externally surrounding the opening. As will be explained, the crank 21 is adapted to impart rotation to reverse flow cleaning means 28 and a coupling 29 is keyed on the free end of the shaft 22 for detachable connection with the cleaning means.

A plurality of elongate, cylindrical filter elements 30 is arranged in a circle and extends longitudinally of the outlet chamber 18 between the partition 16 and outlet 20 with their inlet ends communicating with circular openings 31 in said partition. As shown most clearly in FIG. 4, each opening 31 is surrounded by a nipple 32 which projects into the outlet chamber for engagement by the inner end of one of the filter elements 30. The latter are of more or less conventional construction and each includes a tubular core 33, of suitable porous material, having a ring 34 at its inlet end and a circular closure plate or disk 35 at its outlet or downstream end for securing a cloth sheath or sleeve 36 therearound. As shown, the ring 34 and disk 35 are adapted to be formed of rigid plastic or other suitable material. A perforated, metallic case or shell 37 encloses each core 33 and has an internal, recessed flange 38 at its inlet end for engagement over one of the nipples 32 with a sealing gasket 39 interposed therebetween. If desired, the rigid ring 34 may be cushioned from contact with the flange 38 of the case 37 by a ring 40 of resilient material. In order to permit replacement of the core, a complementary, flanged, metallic disk or closure plate 41 is removably confined within the outlet or downstream end of the case by a suitable retainer 42 (FIG. 6).

Figures 4, 5, 7:
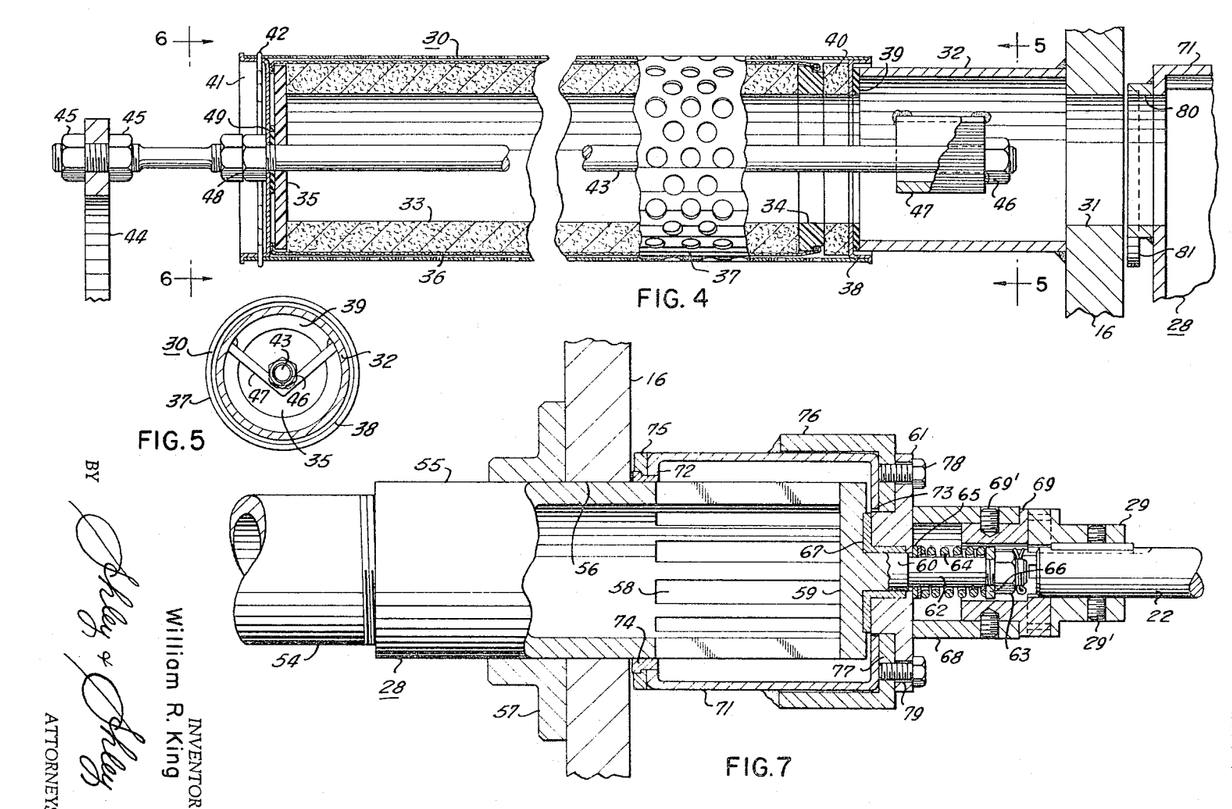
FIG. 4 is an enlarged, broken longitudinal, sectional view of one of the filter elements, is mounting and relation to the rotatable arms of the cleaning means.
FIG. 5 is a transverse, vertical, sectional view taken on the line 5—5 of FIG. 4.
FIG. 7 is an enlarged, fragmentary, longitudinal sectional view, partly in elevation, showing the mounting of the cleaning arm.

An elongate rod 43 extends coaxially through each filter element 30 for detachably connecting the element to an upright, annular supporting member or bracket 44 extending transversely of the outlet chamber 18 adjacent its outlet 20. One end of each rod 43 projects through and is clamped to the annular bracket 44 by a pair of nuts 45, while a nut 46 is screwthreaded on the opposite end of the rod for engagement with a V-shaped bracket 47 which extends transversely of and is secured within each nipple 32 (FIG. 5). A pair of nuts 48 is screwthreaded on each rod adjacent and inwardly of the nuts 45 and bear externally against the flanged disk 41 of each case 37 for coacting with the nut 46 and V-bracket 47 for clamping each filter element in engagement with each nipple. Leakage around the rod is prevented by a sealing gasket 49 which is interposed between the disks 35 and 41. As most clearly shown in FIG. 2, the annular supporting bracket 44 is maintained concentrically of the vessel 10 by two or more radial feet or lugs 50 which rest on the side wall 11 and has at least one, preferably two, apertured ears or lugs 51 projecting axially therefrom adjacent the feet for receiving bolts 52 which are screwthreaded in bosses 53 secured to said side wall to prevent movement of said bracket.

The reverse flow cleaning means 28 includes an elongate, cylindrical tube or pipe 54 extending coaxially of the outlet chamber 18 in concentric relation to the circle of filter elements 30 and has a short sleeve 55 screwthreaded on one end thereof for projecting through an axial opening 56 in the partition 16 into the inlet chamber 17. A flanged collar 57 may secure one end portion of the sleeve 55 within the outlet chamber, while the other or inlet end portion of said sleeve has a plurality of equally-spaced, elongate openings or slots 58 extending longitudinally thereof within the inlet chamber. The inlet end of the sleeve is closed by a circular plate or disk 59 having an axial, external boss 60 upon which an annular, externally-flanged follower 61 is confined (FIG. 7). The outer portion of the boss 60 is of reduced diameter to provide a coaxial pin 62 which has a nut 63 screwthreaded on its extremity for confining a helical spring 64 thereon in engagement with the flanged follower 61 so as to urge said follower as well as the disk 59 toward the sleeve 55. Conventional spring followers 65 and 66 may overlie the ends of the spring 65, and an annular, flanged bushing 67 is recessed in and confined between the disk and flanged follower to facilitate relative rotation and minimize leakage therebetween. The follower 61 has a collar 68 secured thereto and projecting in concentric, spaced relation to the pin 62 for receiving a coupling 69 which is adapted to coact with the coupling 29 of the shaft 22 for transmitting rotation of the crank 21 to said follower. Suitable set screws 29′ and 69′ respectively fasten the couplings 29 and 69 to the shaft 29 and collar 28. As shown at 70 in FIG. 1, the couplings have coacting jaws to provide a detachable connection therebetween.

Again referring to FIG. 1, the reverse flow cleaning means 28 includes a transverse, hollow member or arm 71, which is rectangular in cross-section, extending parallel to the partition 16 within the inlet chamber 17 and having one end portion confined upon the slotted portion of the sleeve 55 of the tube 54 between said partition and the flanged follower 61. An opening 72, substantially complementary to the sleeve, is formed in one lateral wall of the arm 71 and an alined opening 73, of less diameter, is provided in the opposite side wall of said arm to permit mounting of the latter on said sleeve and on the inner portion of the flanged follower in surrounding relation to the slots 58 of said sleeve and for rotation relative thereto with said follower (FIG. 7). The sleeve 55 carries an annular, flanged bushing 74 for snug engagement within the opening 72 to facilitate rotation of the arm and minimize leakage through said opening, the margin of which may be reinforced by a suitable ring 75 encircling the bushing.

An angular bracket or U-shaped yoke 76 is confined on the inner portion of the follower 61 in overlying, straddling relation to the cleaning arm 71, being secured thereto, and has its web portion 77 interposed between said follower and the outer lateral sufarce or side wall of said arm for screwthreaded engagement by a plurality of screws 78 which project through axially directed openings 79 in the peripheral portion of said follower. As most clearly shown in FIG. 4, a short nipple 80 projects laterally from the free or outer end of the cleaning arm toward and in close proximity to the partition 16 and is complementary to the openings 31 of said partition for successive registration therewith upon rotation of said arm. In order to minimize the bypassing of fluid from the inlet chamber 17 into the arm 71, around through the nipple 80 when it is partially registered with one of the partition openings, a flat pad 81 projects laterally from each side of said nipple in contiguous, parallel relation to the partition so as to overlie and close the partially registered opening (FIG. 3).

Gas or other fluid under pressure to be filtered enters the inlet chamber 17 of the vessel 10 through the inlet 19 and flows through the openings 31 of the partition 16 and the nipples 32 into the inlet ends of the filter elements 30. Since the downstream or outlet ends of the filter elements are closed, the fluid passes edgewise through said elements into the outlet chamber 18 whereby dirt, dust and other foreign matter is trapped and removed from the fluid. From the outlet chamber, the filtered fluid flows through the outlet 20. The foreign matter separated from the fluid adheres to the inner surfaces of the porous cores 33 and builds up until said cores become clogged, gradually restricting and ultimately stopping flow therethrough, whereby it is necessary to periodically replace the filter elements 30 or to cleanse the same by reversing the flow therethrough. The cleaning means 28 permits this reverse flow without stopping the operation of the filter since the nipple 80 of the arm 71 communicates through the partition openings with the inlet ends of all the filter elements upon rotation of said arm by the crank 21 and its shaft 22.

Figures 8, 9, 10:
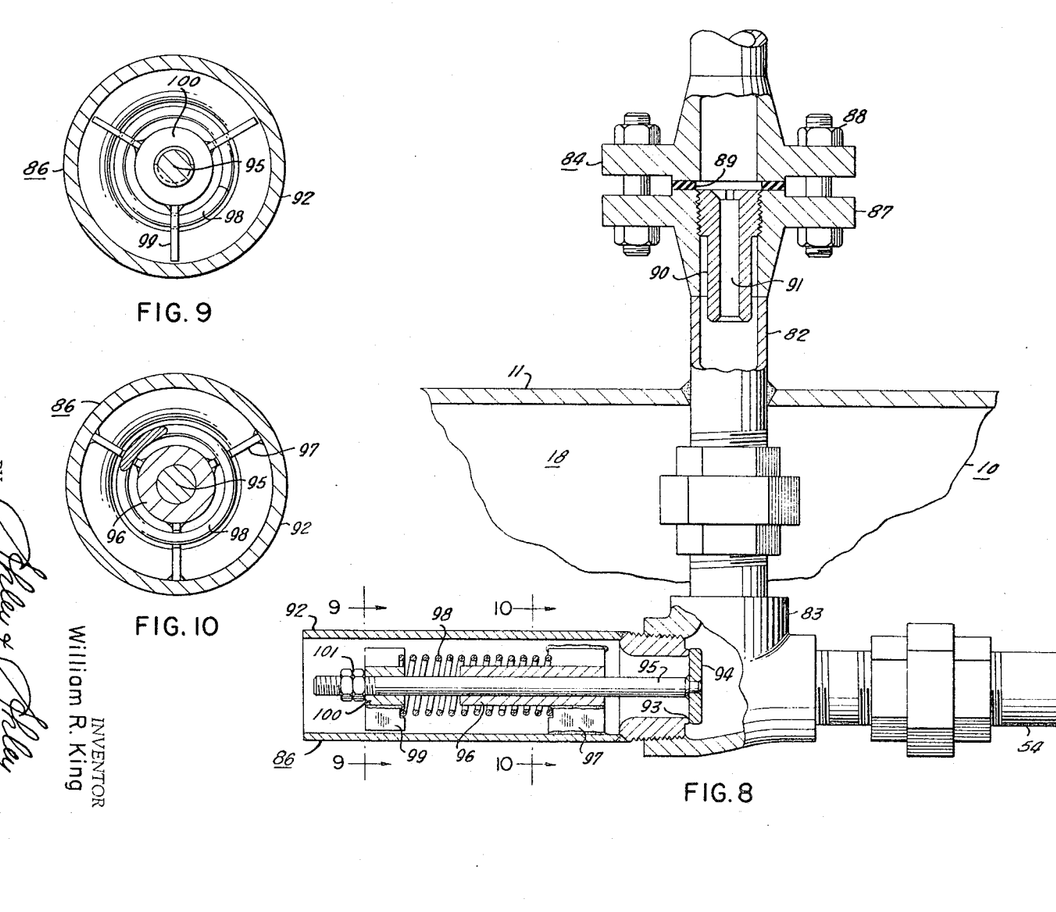
FIG. 8 is an enlarged, fragmentary view, partly in elevation and partly in section, showing the flow restricting and pressure responsive means for controlling flow through the discharge passage of the cleaning means.
FIG. 9 is a transverse, vertical, sectional view taken on the line 9—9 of FIG. 8.
FIG. 10 is a view, similar to FIG. 9, taken on the line 10—10 of FIG. 8.

A discharge passage for accommodating the reverse flow of fluids is provided by the tube 54 and the interior of the hollow arm 71. The down-stream or outer end of the tube has a lateral discharge conductor or pipe 82 connected thereto by a T 83 and extending transversely of the outlet chamber 18 through the side wall 11 of the vessel to the atmosphere or other point of disposal (not shown) so as to form a part of the discharge passage. A choke 84 or other means for restricting or controlling the rate of reverse flow through the discharge passage is mounted in the discharge pipe 82 which has a suitable shut-off valve 85 connected therein outwardly of the choke and adapted to be opened when it is desired to operate the cleaning means 28. The T 83 has a pressure-responsive valve 86 connected thereto so as to be exposed to the pressures of the fluids in the outlet chamber and discharge passage for actuation by the differential between said pressures. As shown in FIG. 8, the choke 84 may include a pair of flanged couplings 87 having connecting stud bolts and nuts 88 and a gasket 89 for sealing off therebetween. A conventional choke nipple 90, having an orifice or coextensive bore of reduced diameter, may be screwthreaded or otherwise mounted in the bore of one of the couplings 87, preferably the inner coupling, so as to extend longitudinally of said coupling for restricting the reverse flow through the discharge passage. It is noted that the choke nipple 90 is readily removable to permit replacement by a choke of greater or lesser diameter or capacity.

The pressure responsive valve 86 is adapted to open and admit fluid under pressure from the outlet chamber 18 to the discharge passage whenever the pressure of the fluid in said passage falls a predetermined amount below the fluid pressure in said outlet chamber so as to prevent collapsing or other damaging of the filter elements 30 by an excessive pressure differential. Since it is exposed to the fluid pressure in said discharge passage as well as to the fluid pressure in the outlet chamber, the valve remains closed until the differential between the pressures reaches a predetermined amount and said valve undergoes opening movement for the admission of a volume of fluid to said passage from said chamber sufficient to maintain the rate of flow through said passage for which the choke nipple 90 is calibrated. It is noted that the valve 86 is not of the open and shut type in that it moves or fluctuates between opened and closed positions in order to maintain a predetermined pressure differential between the discharge passage and outlet chamber 18 in coaction with the choke 84. Manifestly, the valve remains open or partially opened if the volume of fluid flowing reversely through the filter elements is insufficient to satisfy the capacity of the choke and prevent excessive pressure differential.

Again referring to FIG. 8, the valve 86 includes a tubular body or housing 92 having one end screwthreaded in one branch of the T 83 and its opposite end fully open to the outlet chamber 18 and the pressure of the fluid therein. An annular valve seat 93 is provided at the inner end of the housing 92, so as to face and be exposed to the discharge passage and the pressure of the fluid therein, for overlying engagement by a valve element 94 which may be in the form of a flat, circular plate or disk and which has its entire inner surface exposed to said passage and its fluid pressure. The valve element 94 has an axial rod or stem 95 extending outwardly therefrom throughout the major portion of the valve housing and supported by an elongate guide sleeve 96. A suitable spider 97 is provided for securing the guide sleeve 96 within the housing 92 adjacent its seat 93 and is adapted to be engaged by the inner or one end of a helical spring 98 which is confined upon the valve stem 95 and surrounds the outer portion of said guide sleeve (FIG. 10).

The opposite or outer end of the valve stem 95 carries a floating spider 99 having an axial collar 100 (FIG. 9) for slidably receiving said stem and confined thereon in engagement with the outer or opposite end of the spring 98 by a pair of nuts 101 so as to be movable with said stem. Obviously, the spring constantly urges the valve stem outwardly to hold the valve element in engagement with its seat 93 in coaction with the pressure of the fluid in the discharge passage. Since the outer end of the valve housing 92 opens into the outlet chamber 18, the outer surface of the valve element 94 is exposed to the pressure of the fluid in said chamber and said valve element is unseated to admit said fluid to the discharge passage through said housing whenever the chamber pressure exceeds the combined force of the spring 98 and the pressure of the fluid in said passage.

When the cores 33 of the filter elements 30 become clogged, the shutoff valve 85 is opened and the arm 71 of the cleaning means 28 is rotated to move the nipple 80 into successive registration with said elements to permit the reverse flow of fluid from the outlet chamber 18 inwardly edgewise into the communicating elements and through the discharge passage to the atmosphere. Since the filter element in communication with the discharge passage through the nipple 80 of the arm is out of communication with the inlet chamber 17, said element is not exposed to the pressure of the fluid in said inlet chamber and reverse flow from the outlet chamber is permitted. The pressure-responsive valve 86 is adapted to prevent the fluid pressure in the discharge passage from falling below an amount which might cause collapsing or other damaging of the filter elements 30 communicating with said passage by an excessive pressure differential.

Due to the force of the spring 98 urging the valve element 94 to a closed position, the fluid pressure in the outlet chamber 18 forces said valve element inwardly so as to impart opening movement thereto when the differential between said pressure and the fluid pressure in the discharge passage exceeds a predetermined amount or the force of said spring. As has been pointed out, the opening of the valve 86 admits pressure fluid directly into the discharge passage from the outlet chamber whereby said valve undergoes closing movement when the volume of admitted fluid is sufficient to satisfy the capacity of the choke 84 and thereby increase the pressure in said passage to an amount within the predetermined pressure differential.

Upon completion of the cleansing of the filter elements 30, the shut-off valve 85 is closed to stop flow through the discharge passage and reverse flow through said elements. When the shut-off valve is closed, the fluid pressure within the discharge passage equalizes with the fluid pressure in the outlet chamber 18 whereby the valve element 94 of the pressure-responsive valve 86 is held closed by the force of the spring 58. Due to the removability of the closure plate 13, the filter elements may be removed and replaced upon disconnection of the bracket 44. Access to the interior of the inlet chamber is provided by removal of the closure plate 25. Again, it is noted that the horizontal disposition of the filter vessel 10 is not essential. Also, it is pointed out that the filter vessel, particularly when it is of larger diameter, may contain more than one annular row or circle of filter elements in concentric relation to one another with one of the nipples 80 of the arm 71 and partition openings 31 being provided for each annular row or circle of elements, it being noted that the circle or circles of elements need not be continuous and that more than one nipple, arranged in an arc about the axis of said arm, could be provided for each annular row or circle of elements.

Figures 11, 12, 13, 14:
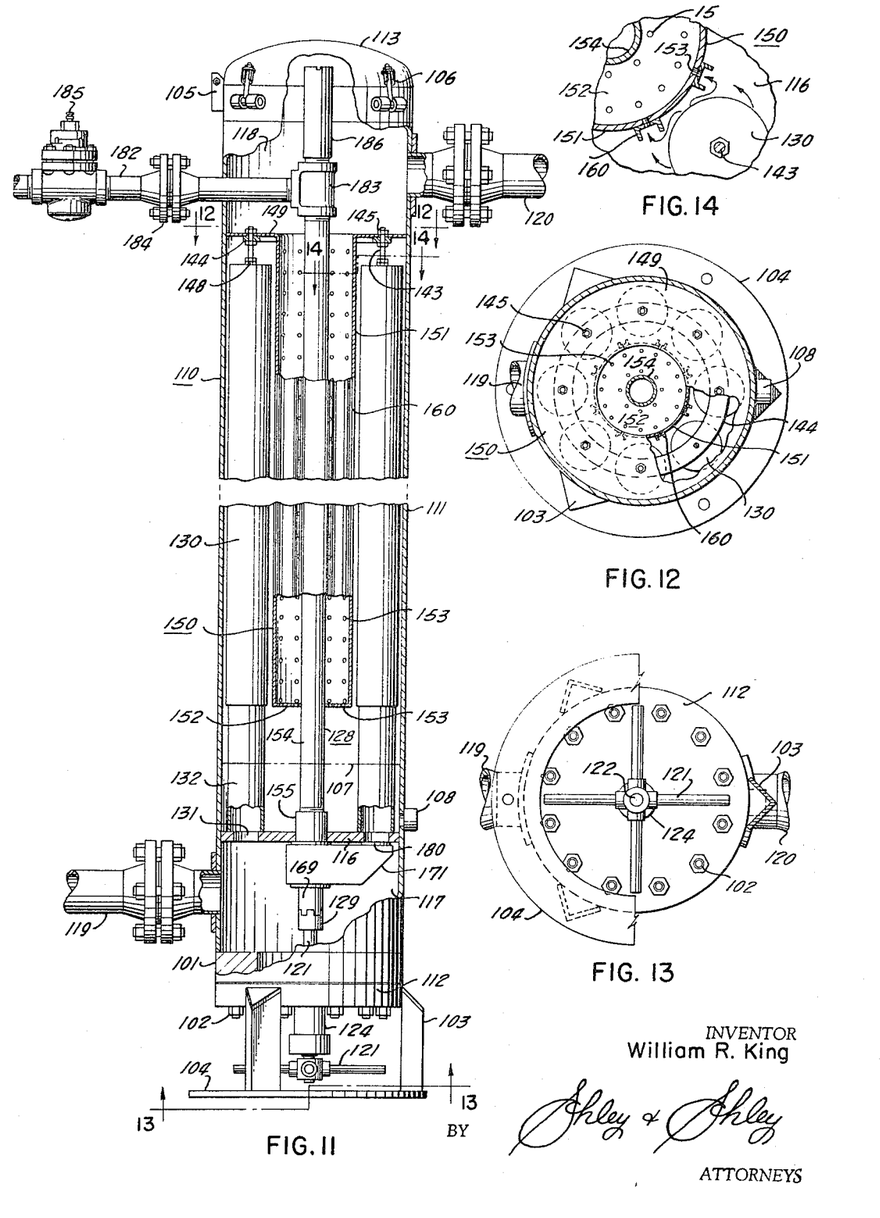
FIG. 11 is a broken, longitudinal, sectional view of an upright slightly modified self-cleaning pressure fluid filter.
FIG. 12 is an enlarged, horizontal, cross-sectional view taken on the line 12—12 of FIG. 11.
FIG. 13 is an enlarged view, similar to FIG. 12, taken on the line 13—13 of FIG. 11.
FIG. 14 is a greatly enlarged, fragmentary, sectional view taken on the line 14—14 of FIG. 11.

A slightly modified self-cleaning pressure fluid filter embodying the principles of the invention is shown in FIGS. 11–14 and includes an upright or vertical vessel 110 which is similar to the substantially horizontal vessel 10 and which has a similar side wall 111 as well as similar bottom and top walls or heads 112 and 113. The bottom end wall 112 is in the form of a relatively thick, flat closure plate fastened to the internally flanged or thickened lower extremity 101 of the side wall 111 by studs and nuts 102 (FIG. 13). Three or more upright legs 103 upstand from an annular base or ground plate 104 to the bottom end wall for supporting the vessel 110 in spaced relation to a foundation (not shown). The top end wall or head 113 is in the form of a dished closure plate hinged at 105 to the upper end of the side wall and detachably latched thereto as shown at 106 (FIG. 11). A substantially horizontal wall or partition 116, similar to the partition 16, extends transversely of the vessel adjacent its bottom wall 112 for dividing the interior thereof into a relatively small or shallow, lower inlet chamber 117 and a relatively large or deep, upper outlet chamber 118. The inlet chamber 117 has a lateral inlet 119 in the lower portion of the side wall 111 for receiving pressure fluid from a source (not shown) and a lateral outlet 120 for the outlet chamber 118 is provided in the upper portion of said side wall adjacent the top end wall. A rimless hand wheel or multispoked crank 121 is disposed below the bottom end wall 112 for rotation within the confines of the legs 103 and has an axial shaft 122 extending upwardly through an external stuffing box 124 mounted on said end wall so as to project coaxially into the inlet chamber. The hand wheel 121 and shaft 122 are comparable to the crank 21 and shaft 22 in that same are adapted to impart rotation to reverse flow cleaning means 128 and said shaft 122 has a coupling 129, similar to the coupling 29 of FIGS. 1 and 7 fixed to its upper end for detachable connection with the similar coupling 169 of said cleaning means.

Similar upright filter elements 130 extend longitudinally of the outlet chamber 118 between the partition 116 and outlet 120 in communication with circular openings 131 formed in said partition through nipples 132 which are of greater length than the nipples 32 to provide space for the accumulation of liquid in the lower portion of the outlet chamber 118 as shown by the broken line 107. A drain outlet 108 extends through the side wall 111 immediately above the partition to permit removal of the accumulated liquid. The upright filter elements have upright supporting rods 143 and mounting nuts 145 and 148 which are similar to the rods 43 and nuts 45 and 48 of FIGS. 1 and 4. Each pair of nuts 145 is adapted to clamp the upper end of each of the rods 143 to an annular, imperforate flange or plate 149 extending transversely of the outlet chamber adjacent its outlet 120 and forming a part of a velocity equalizer or flow diffuser 150, to be described hereinafter, as well as to an annular, transverse bracket or ring 144 similar to the bracket 44 of FIGS. 1 and 2 (FIG. 12).

The reverse flow cleaning means 128 may be and is shown as being substantially identical to the cleaning means 28 of FIGS. 1–10 and includes a similar tube or pipe 154 having a similar sleeve 155 as well as the coupling 169 and a transverse arm 171 at its inner or lower end. Although the filter elements 130 are shown as being disposed in a single circle whereby the cleaning arm requires only a single nipple 180, it is readily apparent that more than one concentric circle of filter elements could be utilized with corresponding quantities of nipples 180 and circles of partition openings 131 being provided for said filter element circles or rows. Also, the circle or circles need not be continuous and more than one nipple, arranged in an arc about the axis of said arm, could be provided for each circle of elements. No attempt has been made to illustrate pads, similar to the pads 81, which are highly desirable and would be disposed laterally of each nipple. A lateral discharge conductor or pipe 182, T 183, choke 184, shut-off valve 185 and pressure-responsive valve 186, all of which are similar to the pipe 82, T 83, choke 84 and valves 85 and 86 and arranged in a similar manner, are provided at the outer or upper end of the tube 154. Since the cleaning means 128 functions in the same manner as the cleaning means 28 reference is made to the detailed description of the construction and operation of the latter.

The velocity equalizer or flow diffuser 150 includes an elongate, cylindrical sleeve or wall 151 extending concentrically between the side wall 111 of the vessel 110 and the tube 154 in relatively close proximity to the filter elements 130 and depending from the annular flange or plate 149 to the lower ends of said elements so as to terminate above or at the upper ends of the nipples 132. A circular plate or disk 152 extends across and closes the lower end of the sleeve 151, the disk and sleeve having a plurality of minute, circular openings or perforations 153 disposed in uniform arrangement whereby the velocity equalizer is foraminous or retriculated, it being noted that the material of said eqaulizer may be foraminous or reticulated instead of being perforated. Since the equalizer 150 is positioned between the outlet 120 of the outlet chamber 118 and the filter elements and since the top flange 149 of said equalizer is solid or imperforate, all of the gaseous fluid must pass through said velocity equalizer or the perforations 153 of its sleeve and bottom disk 152. If desired, the perforations may be offset radially from the filter elements 130 (FIG. 14) so that the fluid cannot flow directly from said elements into the velocity equalizer and must undergo circuitous movement whereby the liquid which tends to adhere or cling to the external or outer surfaces of the filter elements is permitted to coalesce. From these surfaces, the liquid runs downwardly and falls into the lower portion of the outlet chamber above the partition 116 for eventual discharge through the drain 108.

For ensuring circuitous movement of the fluid as shown by the arrows in FIG. 14, the perforations 153 of the sleeve 151 may be disposed in upright, parallel rows and have elongate channels or baffle members 160, of U-shape in cross-section, overlying the same with their flanges directed outwardly. The perforations extend through the base or web portions of the channels or baffle members 160 whereby the fluid must flow around the flanges of said channels in order to enter said perforations so as to ensure reduction of the velocity of the fluid and prevent liquid from being blown into the equalizer 150. Although some gaseous fluids may require specific mist extracting or liquid separating means, which could be mounted in the vessel 110, the velocity equalizer prevents substantially all of the liquid entrained in the fluid from passing through said vessel. Of course, the liquid is separated from or knocked out of most gaseous fluid by the filter elements, but the velocity of said fluid increases exteriorly of and adjacent the outer or outlet ends of said elements and, without the equalizer, results in liquid being forced through or carried out of the vessel. Primarily, the equalizer 150 functions as a diffuser or retarder to reduce the velocity of the fluid, which velocity increases longitudinally of the filter elements, and prevents said liquid from being blown or carried by the fluid from the vessel 110 by forcing said fluid to flow laterally in the outlet chamber before escaping therefrom whereby the re-entertainment of the separated liquid is prevented. Therefore, the velocity equalizer or flow diffuser 150 is highly desirable, if not essential, and it is readily apparent that said equalizer or diffuser could be mounted in the fluid filter shown in FIGS. 1–10. Since the velocity of the fluid is greater at the outer or outlet ends of the filter elements, the perforations or other foramina of the velocity equalizer may be reduced in size or quantity at its outer end portion or progressively outward of said equalizer.

Figure 15:
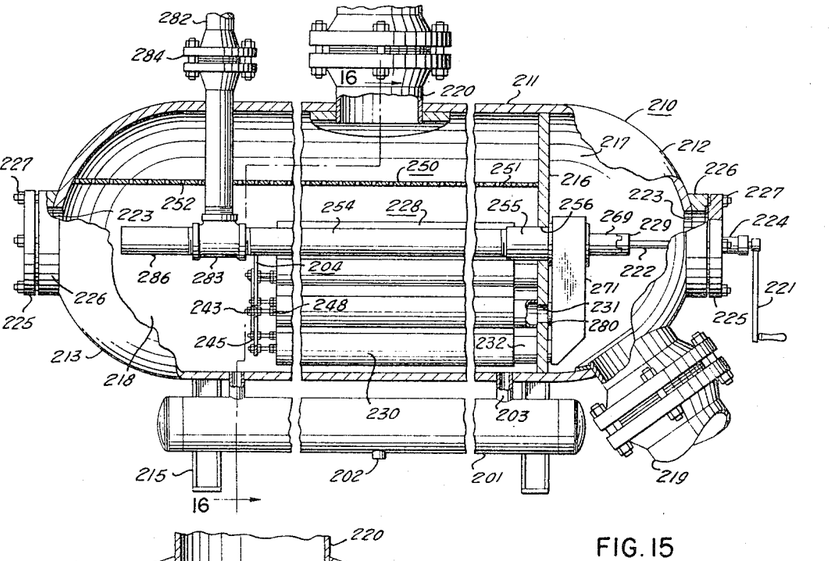
FIG. 15 is a broken, longitudinal, sectional view, partly in elevation, of a further modified pressure fluid filter of the self-cleaning type.
Figure 16:
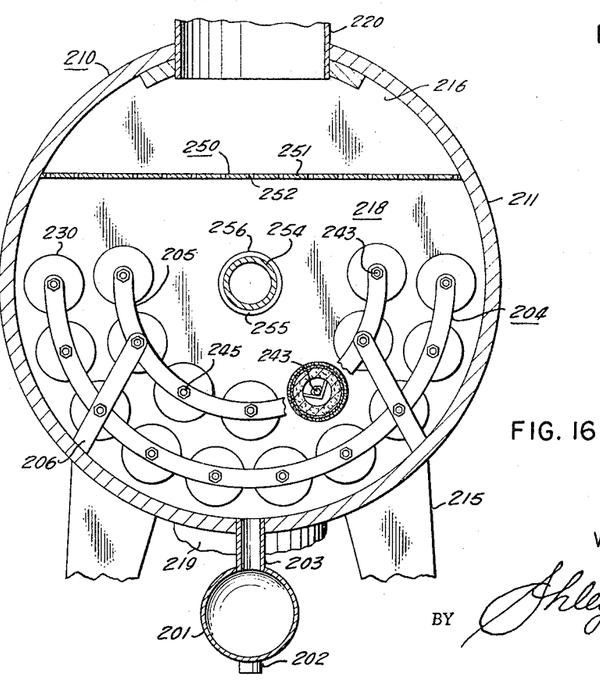
FIG. 16 is an enlarged, transverse, sectional view taken on the line 16—16 of FIG. 15.

A further modified pressure fluid filter of the self-cleaning type is shown in FIGS. 15 and 16 and includes a substantially horizontal vessel 210 which is similar to the vessel 10 of FIGS. 1–3 and which has a similar side wall 211 as well as dished end walls or heads 212 and 213 similar to the dished head 12. The modified vessel 210 has similar, upright, supporting legs 215 depending from its side wall 211 and a similar, upright, transverse partition or wall 216 dividing the interior of said vessel into a similar inlet chamber 217 having an inlet 219, similar to the inlet 19 of the inlet chamber 18, and a similar outlet chamber 218 which communicates with an upright outlet 220 which is similar to the outlet 20 of the outlet chamber 18. A substantially horizontal liquid accumulator tank 201, having a depending drain outlet 202, similar to the drain outlet 108 of FIGS. 11 and 12, may be suspended beneath the modified vessel by a pair of upright nipples or short pipes 203 that establish communication between the tank and the lower portion of the outlet chamber 218.

A crank 221 has its shaft 222 extending through an axial opening 223 in the dished head 212 into the inlet chamber 217 and journaled in a stuffing box 224 mounted externally on a flat closure disk or plate 225 for the opening. An external reinforcing collar or ring 226 surrounds the opening 223 and has the closure plate 225 removably fastened thereto by stud bolts and nuts 227. In the same manner as the crank 21 of FIG. 1, the crank 221 is adapted to impart rotation to similar reverse flow cleaning means 228 and a coupling 229 is secured to the free end of the shaft 222 for detachable connection with the coupling 269 of the cleaning means. Except for the crank, its shaft and the stuffing box 224 of the closure plate, the dished head 213 is identical to the head 212 and includes the axial opening 223, flat closure disk or plate 225, reinforcing ring or collar 226 and bolts and nuts 227. The cleaning means 228 includes an identical pipe or tube 254 extending coaxially of the vessel 210 as well as an identical sleeve 255 for mounting the inner or one end of the tube in the axial opening 256 of the partition 216, the coupling 269 and a transverse arm 271 at said inner end of said tube. Since the partition has two semicircular rows of circular openings 231 in its lower portion instead of one circle or annular row of openings, like the partitions 31 and 131, the cleaning arm 271 has a pair of spaced nipples 280 instead of a single nipple projecting laterally therefrom for registration with the openings upon rotation of said arm and each nipple may be provided with lateral pads simialr to the pads 81 of the arm 71 of FIGS. 1, 3 and 4. A similar lateral discharge conductor or pipe 282, T 283, choke 284, shut-off valve (not shown) and pressure-responsive valve 286 are provided at the outer end of the tube.

Similar filter elements 230 extend longitudinally of the lower portion of the outlet chamber 218 between the partition 216 and head 213 and are arranged in a pair of semicircular rows (FIG. 16) for communicating with partition openings 231 through nipples 232. The filter elements 230 are mounted in substantially the same manner as the filter elements 30 of FIGS. 1-6 by coaxial supporting rods 243 and mounting nuts 245 and 248. Each pair of nuts 245 is adapted to clamp the outer end of each of the rods 243 to an upright supporting member or bracket 204 extending transversely of the lower portion of the outlet chamber. Although subject to variation, preferably, the bracket 204 includes a pair of concentric, semicircular, flat bars 205, having radii complementary to the radii of the semicircular rows of partition openings, connected in spaced relation to each other by the rods and nuts and by flat, transverse bars or straps 206 which also support and space the semicircular bars 205 as well as the outlet ends of the filter elements from the side wall 211 of the vessel 210. It is noted that the vast majority of the filter elements 230 of one semicircular row are not and need not be in radial alinement with the elements of the other semicircular row and that only one or more additional rows of filter elements could be employed with the number of nipples 280 of the cleaning arm 271 varying with the number of rows, unless it is desired to provide more than one nipple for each row.

The reverse flow cleaning means 228 may be and is illustrated as being substantially identical to the cleaning means 28 and 128 and functions in the same manner to prevent excessive pressure drop across the filter elements 230 when said elements are being cleansed by reverse flow from the outlet passage 218 and through said elements into the arm 271, tube 254 and pipe 282 of the discharge passage. Since the circles of filter elements are not continuous and since the elements of one circle are offset or radially misalined with the elements of the other circle, there is greater variation of the pressure of the fluid in the discharge passage and more frequent fluctuation of the valve 286 between opened and closed or partially opened and partially closed positions in order to satisfy the capacity of the choke 284 and prevent excessive pressure differential and, in some instances, the valve is fully closed or fully opened.

For preventing liquid, which has been separated from the fluid by the filter elements 230, from being blown or carried from the outlet chamber 218 by the fluid escaping through the outlet 220, a flow diffuser or velocity equalizer 250 is disposed in said chamber between said elements and outlet. Although subject to variation, preferably, the diffuser or equalizer 250 includes a substantially horizontal flat member or plate 251 extending longitudinally from the dished head 213 to the partition 116 and transversely between opposed portions of the side wall 211 in overlying, spaced relation to the filter elements. A plurality of minute, circular openings or perforations 252 are uniformly spaced throughout the diffuser plate 251 whereby said plate is foraminous or reticulated and may be formed of the latter type of material.

Since the flow diffuser or velocity equalizer extends beyond the outer or outlet ends of the filter elements 230 so as to occupy a greater area of the outlet chamber 218, it is readily apparent that the flow of fluid from said elements to the outlet 220 is distributed or spread out over a relatively large area and the tendency of said fluid to channel directly from said elements to said outlet is minimized. As a result, the velocity of the fluid is reduced or retarded so as to prevent the separated liquid from being picked up by the fluid ascending from the filter elements to the outlet and permit said liquid to fall to the lower portion of the outlet chamber for flowing through the nipples 203 into the accumulator tank 201.

Above or outwardly of the diffuser 250, the velocity of the fluid may, and usually does, increase without carrying separated liquid therewith. If necessary, the perforations 252 of the portion of the diffuser plate 251, which immediately overlies the filter elements 230, may be reduced in size and/or number so as to encourage the fluid to flow through the portion of said plate which extends beyond the outer or outlet ends of said elements. It has been found that the flow diffuser or velocity equalizer functions more efficiently when, as shown, it is positioned closer to the uppermost filter elements than to the outlet 220. In any event, this location permits the diffuser or equalizer 250 to be of greater area. It is noted that the filter vessel 210 may be dsiposed in an upright position and that, irrespective of the vessel position, the filter elements 230 may be arranged in one side of said vessel instead of at the lower portion thereof whereby said elements as well as the flow diffuser or velocity equalizer extend uprightly. In the latter event, the accumulator tank is moved so as to be disposed below the lower portion of the filter vessel.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:
1. A self-cleaning pressure fluid filter including a vessel having an inlet chamber having an inlet means and an outlet chamber having an outlet means, partition means separating the inlet and outlet chambers, a plurality of substantially parallel filter elements arranged in at least one arc about a common axis within the outlet chamber and having inlet ends communicating with the inlet chamber through the partition means whereby fluid flow under pressure through the vessel is forced through the filter elements, reverse flow cleaning means mounted for rotation in said vessel and having a discharge passage for successive communication with the inlet ends of said filter elements to permit fluid from said outlet chamber to flow in a reverse direction through said elements into said discharge passage, means for restricting flow through the discharge passage, and pressure responsive means exposed to the pressure of the fluid in the discharge passage and to the pressure of the fluid in said outlet chamber for opening to said chamber to admit fluid from said chamber into said passage when the differential between said pressures exceeds a predetermined amount.

2. A filter as set forth in claim 1 wherein the flow restricting means is fixed.

3. A filter as set forth in claim 1 wherein the pressure responsive means includes valve means which requires an effective greater pressure for opening movement than for closing movement thereof.

4. A filter as set forth in claim 3 including spring means for resisting opening movement of the valve means.

5. A filter as set forth in claim 3 wherein the valve means is exposed directly to the pressure fluid in the outlet chamber and the pressure fluid in the discharge passage.

6. A filter as set forth in claim 1 wherein the flow restricting means is mounted in the discharge passage downstream of the fluid admitting means.

7. A filter as set forth in claim 6 wherein the flow restricting means includes a fixed choke.

8. A filter as set forth in claim 1 including means in the outlet chamber between its said outlet means and the filter elements for impeding flow through said chamber so as to reduce the velocity of the fluid and prevent liquid entrained therein from being blown through said outlet chamber and permit at least a portion of the liquid to drop out of said fluid.

9. A filter as set forth in claim 8 wherein the filter elements are disposed in at least one circle and wherein the flow impeding means includes a perforated member disposed within the circle of filter elements.

10. A filter as set forth in claim 8 wherein the flow impeding means includes means for equalizing the velocity of the fluid by distributing said fluid over a wide area of the outlet chamber.

11. A filter as set forth in claim 1 including means in the outlet chamber between its said outlet means and the filter elements for equalizing the velocity of the fluid to prevent liquid from being carried out of said chamber by said fluid and permit separation of the liquid from said fluid.

12. A filter as set forth in claim 11 wherein the velocity equalizing means includes a foraminous member which separates the filter elements from the outlet means of the outlet chamber.

13. A filter as set forth in claim 11 wherein the filter elements are disposed in at least one circle concentric of the common axis, the velocity equalizing means including a cylindrical foraminous member surrounded by the circle of filter elements for diffusing the flow of fluid from said elements to the outlet means.

14. A filter as set forth in claim 13 wherein the foramina of the cylindrical member are offset relative to the filter elements.

15. A filter as set forth in claim 11 wherein the arc of filter elements occupies only a portion of the cross-sectional area of the outlet chamber, the velocity equalizing means including a foraminous member separating said filter elements from the outlet means so as to diffuse the flow of fluid from said elements to said outlet means.

References Cited by the Examiner
UNITED STATES PATENTS

| 2,237,964 | 4/1941 | Haught | 210—108 X |
| 2,742,156 | 4/1956 | Spangler. | |
| 3,168,467 | 2/1965 | Dreyer | 210—108 |
| 3,176,846 | 4/1965 | Adams | 55—302 X |
| 3,228,528 | 1/1966 | Mummert et al. | 210—333 |

FOREIGN PATENTS 1,253,094  12/1960  France.

REUBEN FRIEDMAN, *Primary Examiner.*

D. M. RIESS, *Assistant Examiner.*